United States Patent [19]

Brode et al.

[11] 4,403,066

[45] Sep. 6, 1983

[54] COMPOSITES MADE FROM LIQUID PHENOL FORMALDEHYDE RESINS

[75] Inventors: George L. Brode; Sui-Wu Chow; Warren F. Hale, all of Bridgewater Township, Somerset County, N.J.

[73] Assignee: Union Carbide Corporation, Danbury, Conn.

[21] Appl. No.: 340,855

[22] Filed: Jan. 20, 1982

[51] Int. Cl.³ .............................................. C08L 61/06
[52] U.S. Cl. .................................... 524/876; 525/429
[58] Field of Search ...................... 524/876, 841, 594; 525/429

[56] References Cited

U.S. PATENT DOCUMENTS

| | | | |
|---|---|---|---|
| 3,485,797 | 12/1969 | Robins | 524/876 |
| 4,043,970 | 8/1977 | Dahms | 524/594 |
| 4,105,623 | 8/1978 | Shannon et al. | 524/876 |
| 4,122,054 | 10/1978 | Culbertson | 524/594 |
| 4,157,324 | 6/1979 | Culbertson | 524/594 |

FOREIGN PATENT DOCUMENTS 744182 7/1970 Belgium .............................. 525/429

*Primary Examiner*—Lewis T. Jacobs
*Attorney, Agent, or Firm*—Reynold J. Finnegan

[57] ABSTRACT

Disclosed are reinforced composites having a high content of reinforcing material such as glass fiber. They are made from liquid phenol-formaldehyde resoles containing a small amount of unbound water and volatile organic compounds.

4 Claims, No Drawings

COMPOSITES MADE FROM LIQUID PHENOL FORMALDEHYDE RESINS

The present invention is directed to reinforced composites made from liquid phenol-formaldehyde resole resins. In particular the invention is directed to such composites made by injection molding processes. The composites have excellent physical properties and are flame resistant.

Thermosetting compositions have been known for many years and have been employed in many applications because of such advantageous properties as light weight, high heat resistance and excellent dimensional stability. The traditional method for processing thermoset molding compounds involves blending with fillers, pigments and other additives, followed by compounding and granulating. The granulated compositions are then fabricated by any of the well known methods such as compression, transfer, or injection molding. This multi-step process is cumbersome and energy intensive. Furthermore, the compounding step often causes considerable attrition of the reinforcing fiber and thus the reinforcing action of the fiber is not efficiently utilized. As a consequence, ultimate high impact resistance is often not obtained.

Recently, there have been devised thermoset fabrication methods in which liquid thermosettable compositions are injected directly into a mold where curing takes place, resulting in the formation of a fabricated part. Depending on the injection process and the nature of the compositions, these methods are known as liquid injection molding (LIM), reaction injection molding (RIM), or resin transfer molding (RTM).

Another process for manufacturing high strength thermoset composites is the sheet-molding compound (SMC) method. In this process, a liquid thermosetting resin, such as an unsaturated polyester, reinforcing fiber and other additives are mixed under low shear conditions. The resulting viscous mixture is partially cured to non-tacky sheets. Final curing to finished parts is then carried out in a mold. The commercial applications of this method have been generally limited to unsaturated polyesters which, unless they are specially treated, exhibit poor flammability resistance. In addition, careful formulation is required to obtain good processability and smooth surfaces.

The liquid injection molding processes are rapid and adaptable to high speed production requirements, and since the curing reaction is generally exothermic, these processes are less energy intensive than the traditional methods for processing thermosetting resins. Furthermore, because these relatively new thermoset fabrication methods for cure are low pressure processes, there is required considerably lower clamping forces than those required for the injection molding of engineering plastics, and thus lower capital and operating expenditures are required.

However, attempts to use these processes in fabrication of composites of condensation products such as conventional phenolic resins have resulted in difficulties arising due to a high viscosity or to residual unbound water and volatile organic impurities present in the resin. Heretofore, due in large part to the high viscosity of many resins, the maximum attainable content of reinforcing material of composites has been limited to about 45 weight percent. The high viscosity of these resins, many of which are solid or nearly solid at room temperature, necessitates high shear mixing with the reinforcing material and injection into the mold under high shear conditions. This results in significant attrition of the reinforcing material, thus lowering the strength of the final composite. The high viscosity also prevents sufficient wetting of the fiber and mixture with the fiber. This results in composites of poor physical properties and separation of the composites at the site of the fibers. For this reason fiber content of such composites has generally been limited to about 45 weight percent or below.

Additionally, the presence of volatile organic compounds and water can result in problems by causing undesirably high mold pressure and formation of bubbles in the formed composite, resulting in a loss of strength of the composite. Many compositions, particularly lower viscosity phenolic termosetting compositions, contain significant amounts of water and/or organic diluents rendering them unsuitable for liquid injection processes.

Phenolic composites are known for their high temperature mechanical strength, flammability resistance and solvent resistance. Therefore, a liquid phenolic composition free of unreactive solvents such as water and volatile organic compounds and having low enough viscosity for liquid injection molding processes would be highly desirable.

It has now been found that composites having a high content of reinforcing material can be made from liquid phenol-formaldehyde resole resins. The use of phenol-formaldehyde resins in the making of composites has heretofore been impractical due to the high viscosity or the presence of water and volatile compounds. It has been found that by using certain liquid resins having a very small amount of water and volatile organic compounds, it is possible to obtain composites having a content of reinforcing material not heretofore possible. The cured composites of the invention comprise from about 20 to about 70 weight percent, preferably from about 50 to about 70 weight percent based on the weight of the cured composite, of a reinforcing material, and from about 30 to about 80 weight percent, preferably from about 30 to about 50 weight percent, based on the weight of the cured composite, of a cross-linked phenol-formaldehyde solid resin derived from a curable liquid phenol-formaldehyde resole resin containing less than about 5 weight percent, preferably 2 weight percent, of unbound water and volatile organic compounds based on the weight of the liquid resin.

When used in a process such as sheet molding compounds the viscosity of the liquid resin should be less than about 500,000 centipoise at 25° C.

Preferably a liquid injection molding process is used, in which case the liquid resin should have a viscosity less than about 10,000 centipose at 25° C.

As described above the liquid resin should have less than 5 weight percent, preferably 2 weight percent, based on the weight of the resin, of unbound water and volatile organic compounds. By unbound water is meant water that is present as a contaminant and is distinguished from that water produced during the condensation reaction during cure. Volatile organic substances are those that volatilize to form a gas when the resin is exposed to elevated temperatures, about 100° C. These include formaldehyde not incorporated in the methylol groups, hemiformal groups on methylol linkages of the resin. Also included are the solvents typically used to reduce the viscosity of a resin, such as alcohol or aromatic hydrocarbons. Also included are such substances such as methanol that may be introduced as contaminants in the formaldehyde or phenol used in manufacture of the resin.

The composites of the invention may be made from a liquid phenol-formaldehyde resole resin curable to a solid crosslinked phenol-formaldehyde solid resin, said liquid resin containing the above recited amounts of unbound water and volatile organic compounds. This includes, for example, liquid resins disclosed in U.S. Pat. No. 3,485,797, issued to Robins on Dec. 23, 1969. The preferred liquid resin for use in the composites of the invention are those disclosed in U.S. patent application Ser. No. 340,853, filed by Brode, and Chow Jan. 20, 1982.

The resins disclosed in the above cited U.S. application Ser. No. 340,853 are phenol-formaldehyde polymeric resins that have stable hemiformal groups incorporated into their structure. These resins are high-ortho, namely, the phenol moieties of these resins are linked by methylene and methylene ether linkages, principally at the ortho position. Due in large part to the presence of the hemiformal groups and the high linearity attributable to the high proportion of ortho- ortho-linkages, these polymers are of low viscosity and are particularly suitable for use in injection molding processes such as liquid injection molding (LIM), reaction injection molding (RIM), hydrajecting, and resin transfer molding (RTM). These resins are stable at storage conditions but are highly reactive at elevated temperatures and in the presence of acid or base catalysts typically used in aldehyde-phenol polymerization reactions. This reactivity is due in large part to the hemiformal groups which readily react with the phenol moities of the resin through a condensation-type reaction to form a cross linked phenol-formaldehyde resin solids.

An additional advantage of the preferred liquid resin is the low concentration of volatile organic compounds, such as alcohol, unbound water and the reaction products of these with formaldehyde. When the resin is subjected to cure temperatures, these substances form gases such as vapors of water and alcohol byproducts and gaseous formaldehyde, which leads to high mold pressure and voids in the composite. Thus, a low concentration of unbound water and volatile organic compounds reduces the amount of vapor products formed during cure. An advantage is also imparted by the high reactivity of the hemiformal groups, which are generally more reactive toward the forming of a phenolic resin than the formaldehyde compounds of water and alcohols, which as described above, contribute to gas formation. The presence of the highly reactive hemiformal groups, therefore, provides for reaction toward the desired phenolic resin product and less formation of the undesired gaseous formaldehyde when the resin is cured.

The amount of unbound water and volatile organic compounds present in the preferred liquid resin should be less than 5, preferably less than 2 weight percent, based on the total weight of the composition.

Removal of water and organic solvents from a phenolic type resin to a low concentration generally has resulted in resins of high viscosity, many being solid or nearly solid, rendering them unsuitable for a liquid injection process. Thus, the low viscosity compositions of the invention having a low unbound water content is an advance in the art.

The high-ortho structure of the preferred liquid resin also allows the para-position of the phenol moieties to be free. The para-position is more reactive than the ortho-position in condensation and crosslinking reactions. Therefore, having a higher proportion of free para-positions allows for resins having a higher reactivity.

The preferred liquid resins useful in the invention are of the formula:

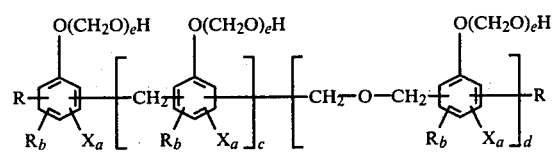

wherein a is from 0 to 3, b is 0 to 1, the sum of a and b does not exceed 3, the sum of c and d is from 2 to about 20, the mole fraction $d/(c+d)$ is 0.4 to 0.9, preferably 0.6 to 0.8, R is $-CH_2O(CH_2O)_eH$, e is 0 to about 5, X is a monovalent radical, wherein for at least one of the R or $O(CH_2O)_eH$ group, e is at least 1 and,

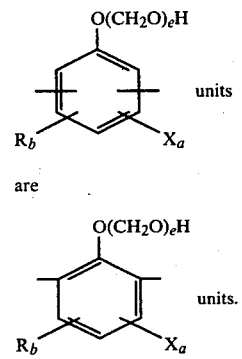

The above values are average values and an actual composition of the preferred resin will be an equilibrium mixture.

X is any substituent typically employed in conjunction with a phenolic structure. With respect to X, it is preferably a monovalent radical which includes alkyl of from about 1 to about 18 carbon atoms, cycloalkyl from 5 to 8 carbon atoms, aryl containing from 1 to about 3 aromatic rings, aralkyl, alkaryl, alkoxy containing from 1 to about 18 carbon atoms, aroxy containing 1 to 3 aromatic nuclei, halide such as chloride, bromide, fluoride, and iodide; alkyl sulphides having from 1 to about 18 carbon atoms, aryl sulphides having from 1 to about 3 aromatic nuclei, and the like.

The preferred liquid resins useful in the invention are made by reacting a phenol and formaldehyde under azeotropic distillation conditions in the presence of a divalent metal catalyst. Azeotropic distillation is a process well known in the art and involves the use of a separating agent. The separating agent forms an azeotrope with the overhead product and thereby facilitates separation from the bottoms product. In the present invention a separating agent such as toluene forms an azeotrope with water, thereby facilitating the separation of water from the reacting mixture where the high-ortho resins useful in the invention are being formed.

Suitable separating agents are well known in the art and include toluene and substances that form an azeotrope with water at a temperature between about 80° and 120° C. at atmospheric pressure and are unreactive with phenols and aldehydes.

The formaldehyde may be introduced to the reaction mixture as aqueous formaldehyde solution or as paraformaldehyde.

Although the composition of the invention is defined in terms of formaldehyde, it is well known in the art that other aldehydes such as acetaldehyde, propionic aldehyde, butylaldehyde and furfural can be substituted for formaldehyde in phenol-formaldehyde type resins. The use of other aldehydes is, therefore, contemplated in the compositions of the invention. However, in order that hemiformal groups can form, some formaldehyde should be present in the reaction mixture wherein the compositions of the invention are formed. At least 20 mole percent formaldehyde, based on the total moles of aldehyde used, should be sufficient formaldehyde to form the hemiformal groups.

The phenols suitable for use in the invention are phenol per se, substituted phenols and mixtures thereof. Preferably the mixtures contain phenol. Suitable phenols can be represented by the formula;

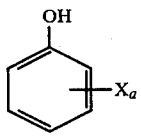

where X and a are defined above, and wherein at least two of the ortho- and para-positions relative to the hydroxy group are free. Preferably both ortho-positions should be free. Most preferably the substituents should be in the meta-positions only, leaving the ortho- and para-positions free. When using substituted phenols at least 50 mole percent should have both ortho-positions free. Examples of suitable substituted phenols are cresol, isopropylphenols, nonylphenols or dihydric phenols, such as bis-phenol A, bis-phenol F, hydroquinone and resoncinol. Use of substituted phenols will tend to alter the properties of any resulting phenolic resin which is derived from the resulting product, such property changes being of the kind which allows for a maximum variety of phenolic resin product types. For example, a halogen substitution will enhance the flame retardency of the resultant phenolic resin. A aryl-alkyl substitution which contains a hydroxyl group as well, such as bisphenol A, will provide a phenolic resin which is a superior coating resin and will possess better color properties. Also a diphenol such as bisphenol A has an additional phenolic hydroxy group, providing another site for hemiformal production. The substituents will impart these properties to the final cured product that are known in conventional phenol-formaldehyde chemistry.

The total aldehyde to total phenol molar ratio should be from about 1.2:1 to 2:1, preferably 1.5:1 to 1.8:1.

The reaction takes place in the presence of a divalent metal cation such as magnesium, calcium, lead, manganese, strontium, barium, zinc, cadmium or mercury, at a pH of about 3 to 8, preferably from about 4 to 6. Typically, the metal cation is supplied as a salt or as an alkoxide such as a carboxylate salt, or a methoxide or ethoxide of the metal in combination with a mild acid to achieve the desired pH. Suitable salts include the formates, acetates, benzoates, and valerates. Examples of these salts include zinc acetate dihydrate, calcium formate, manganous acetate, lead acetate and zinc benzoate.

The divalent metal salts may be introduced in the initial reaction mixture or they may be generated in situ by combination of their oxides or hydroxides and a carboxylic acid. Preferably the salts are soluble in the reaction medium. Typically the concentration of the salt in the medium is about 0.2 to 1 weight percent, preferably about 0.4 to 0.7 weight percent based on the total weight of the reaction mixture.

The reaction is carried out under azeotropic conditions. The pressure should be at a value where an azeotrope is formed between the separating agent and water. Typically, the separating agent is toluene and the pressure is atmospheric which gives a reaction temperature of about 80° to 120° C.

The formaldehyde source is preferably added incrementally or metered into the reaction mixture during the course of the reaction.

The reaction is continued after formaldehyde addition until the high-ortho resin of the invention begins to form and essentially all of the separating agents, and the water, introduced with the reactants and formed during the condensation reaction, are removed. Continuing the reaction will, in addition to removing more of the last traces of water and separating agent, cause the viscosity to rise. The viscosity rise is due mainly to a rise in molecular weight of the resin. Thus, the viscosity of the product can be regulated by the length of the reaction. For use in liquid injection molding methods, the viscosity should be from about 1000 centipoise to about 10,000 centipoise (Brookfield at about 25° to 30° C.). For the sheet molding compounds method, the viscosity is not narrowly critical and can be about 1000 centipoise to about 500,000 centipoise (Brookfield at about 20° to 30° C.). Typically the reaction time is from about 5 hours to about 8 hours. Final water and separating agent may be further removed by use of flash distillation at reduced pressure after the azeotropic distillation is over. Typically, this is carried out at a pressure of about 50 100 mm Hg at about 80° to 90° C. for about a half an hour to about 1 hour.

The use of metal salts as catalysts allows the preparation of these resins under neutral conditions and yields resin which contain largely ortho, ortho-substitution between the phenol moieties, i.e., 2.2'-methylene bridges and 2,2'-methylene ether bridges. These structural units are advantageous due to the presence of free para-positions. Since the free para-positions are more reactive than the ortho-positions, the resins are, therefore, more reactive under cure conditions. Also for a given molecular weight, high ortho, ortho-substitution gives resins of lower viscosity than those containing largely ortho, para- and para, para-bridges made under conventional alkaline catalytic conditions. The resins made by the above described method are neutral thus they are more stable under ambient conditions to give greater processing latitude.

Additionally, the preferred resins useful in the invention contain hemiformal groups. During the reaction, formaldehyde reacts with the phenolic hydroxyl group and with methylol groups on the aromatic ring. Generally hemiformals are unstable. It is, therefore, surprising that these hemiformal containing resins are stable at ambient conditions and do not spontaneously react to form higher molecular weight condensation products. By stable, it is meant that at about 25° C. to 30° C. the time required for the viscosity to double is greater than about 200 days. An increase in viscosity indicates condensation into higher molecular weight products. The stability shown by the slow increase here indicated is surprising, considering the presence of the hemiformal groups and the high reactivity of the resin when it is cured.

In addition to the hemiformal groups and the high ortho structure, the preferred liquid resins useful in the composites of the invention also differ from conventional resins in the following respects. Although they are phenol-formaldehyde resole resins in that they are heat reactive without the need of additional curing agent, the resins of the invention contain unbound water or volatile solvents in very small amounts and do not require the addition of organic solvent to achieve a low viscosity for use in liquid injection molding.

If desired, there may be added to the liquid resin a reactive diluent such as ethylene glycol, diethylene glycol, ethanolamines, and various drying oil-modified phenols such as the reaction products of linseed, tung and castor oil with phenol. These reactive diluents are useful for the modification of the viscosity and handling characteristics of the uncured resin or for the modification of the properties of the cured compositions. If employed and depending on the reactive diluents used, the reactive diluent may be added at an amount of from about 5 weight percent to about 30 weight percent, based on the combined weight.

Also, if desired, there may be added to the liquid resin other types of polymers which can co-cure with these reactive compositions. Examples of co-reactive polymers are phenol-formaldehyde resoles, phenol-formaldehyde novolacs, aromatic polyesters, aromatic polycarbonates, unsaturated polyesters, poly(arylethers), urea-formaldehyde resin, and melamine-formaldehyde resins. The use of these additives serves either to modify the properties of the cured product or the handling characteristics of the prepolymer. Examples and chemistry of some of these coreactive polymers are disclosed in copending U.S. patent application Ser. No. 340,720, filed Jan. 19, 1983, by Brode and Chow.

The reinforcing materials suitable for use in the invention include those typically used in the manufacture of reinforced composites, such as glass fibers, carbon fibers, graphite fibers, wollastonite, celulousic fibers such as wood flour and the like, organic fibers such as aromatic polyamide fibers, and mica.

The preferred reinforcing materials are glass fibers, carbon fibers, graphite fibers and aromatic polyamide fibers. These fibers may be in any form common to the art such as chopped fiber, mat, and woven cloth.

The composites of the invention can be formed by any suitable method wherein the liquid resin is mixed with the reinforcing material and the mixture cured in the presence of a suitable catalyst and heat. Preferably the composites are made in a liquid injection molding process such as LIM, RIM or RTM. The reinforcing material may be mixed with the resin prior to injection, but preferably the reinforcing material is introduced into the mold before injection. Typically in such a process, the reinforcing material in a suitable form, such as glass fiber mat, is placed into the mold, the mold heated to cure temperatures, and the resin injected to the mold.

The liquid resin that contains the reinforcing material is cured in the presence of a catalyst and with heat.

The catalysts can either be an acid or a base depending on the cure rate required for the fabrication technique and formulations chosen. In general, all those catalysts which are commonly employed for the cure of phenol-formaldehyde resins are suitable to cure the resins useful in this invention. Typical acid catalysts are sulfuric acid, sulfonic acids such as phenolsulfonic acid, oxalic acid, and boron trifluoride. Other suitable acid-type catalysts are the latent catalysts disclosed in copending U.S. application Ser. Nos. 340,854 and 340,852, both by Chow and Brode and filed simultaneously herewith. These latent catalysts include certain phenyl esters of carboylic acids that form upon cure a carboxylic acid having a pKa of 2 or less. Also included are sulfur dioxide containing compounds that generate sulfur dioxide at cure conditions. Examples of latent catalysts include phenyl hydrogen maleate, phenyl trifluoroacetate and butadiene sulfone. Typical bases are organic amines such as hexamethylenetetramine, trimethylamine, ethanolamines and oxides and hydroxides of metals such as barium and calcium.

The catalyst may be introduced into the liquid resin immediately before injection into the mold. If the above disclosed latent catalysts or catalysts of low activity are used, the catalyst may be premixed with the resin.

Concentration of the catalyst ranges depends on cure rate required and acid or base strength of the catalyst. For a strong acid such as sulfuric acid, the typical concentration is from 0.01 weight percent to 5 weight percent. For weaker acids or bases concentrations as high as 10–15 weight percent can be employed. The latent catalysts are typically used in an amount from about 0.2 to about 10 weight percent, preferably about 0.5 to about 5 weight percent. The basis of the percentages is the weight of the catalyst free liquid resin. Due to the ease of obtaining a homogeneous polymerizing mixture, catalysts soluble in the liquid resin of the invention are preferred.

The liquid resin that contains reinforcing material and catalyst is cured by the application of heat. A temperature of from 100° C. to 180° C., preferable from 120° C. to 160° C., most preferably from 140° C. to 155° C., is employed for the cure. The curing time can be regulated by type and concentration of the catalyst and will vary depending on such factors as the particular composition of the thermosetting resin, the fabrication process, the configuration of the cure part and other factors known to those in the art. When used in liquid injection molding applications, the cure time is typically greater than 20 seconds, generally from about 1 to about 10 minutes.

The following examples serve to further illustrate the invention. They are not intended to limit the invention in any way.

In the examples, the following standard evaluation procedures were employed:

| | |
|---|---|
| Flexural Modulus | ASTM D790 |
| Flexural Strength | ASTM D790 |
| Notched Izod (Impact) | ASTM D256 |
| Heat Deflection Temperature (HDT) | ASTM D648 |
| Tensile Modulus | ASTM D638 |
| Tensile Strength | ASTM D638 |
| Elongation | ASTM D638 |

The injection device used in Examples 8–10 is described in U.S. patent application Ser. No. 135,906, filed Apr. 14, 1980 by Angell.

Examples 1 to 7 illustrate the preparation of various resins useful in the composites of the invention.

EXAMPLE 1

This example illustrates the preparation of a preferred liquid phenol-formaldehyde resin useful in the composites of the invention disclosed in above cited U.S. Application Ser. No. 340,853. Into a 5 gallon vessel equipped with a water separator were charged 7058 grams (75 g moles) of phenol, 35.3 grams of zinc acetate dihydrate and 494 grams of toluene. The solution was stirred and heated to about 100° C., after which 9205 grams of an aqueous solution of formaldehyde containing 48.9 weight percent formaldehyde (150 moles formaldehyde) were metered into the reaction mixture over five hours. There was an initial mild exotherm, which was easily moderated by regulating the source of heat. Water added with the formaldehyde was then removed azeotropically with the toluene using the water separator as a condenser. After all the aqueous formaldehyde solution had been added, the mixture was azeotropically distilled for about an additional 1.5 hours at atmospheric pressure to a temperature of about 108° C. The toluene and water were removed as an azeotropic vapor mixture which was condensed using the water separator. The heat-source was then removed and the distillation continued under a reduced pressure of 50 mm Hg for about half an hour. Total water recovered corresponded to about 103% of the water added in the aqueous formaldehyde solution. The resulting composition had a viscosity (Brookfield Model RVT) of 3900 cp at 29° C. The molecular weight and molecular weight distribution were analyzed by gel permeation Chromatography using a Waters Model 200 Gel Permeation Chromatograph. The number average molecular weight was 350 and the weight average molecular weight was 450. Analysis by NMR of the types of bonds in the resin product showed the presence of hemiformal groups, arylmethylol groups, arylmethylene ether linkages and arymethylene linkages.

EXAMPLE 2

A phenolic resin was prepared as in Example 1 except 8420 grams of a 48.9 weight percent aqueous formaldehyde solution was used, the aqueous formaldehyde solution was added over 4.5 hours, and the reaction mixture was azeotropically distilled for an additional 1.75 hours. The viscosity (Brookfield Model RVT) of the product was 4200 centipoise and the total water recovered corresponded to 99% of the water added with the aqueous formaldehyde solution.

EXAMPLE 3

A phenolic resin was prepared as in Example 1 except 8752 grams of a 47 weight percent aqueous formaldehyde solution was used, the aqueous formaldehyde solution was added over 4.5 hours, and the distillation was continued under reduced pressure after the heat source was removed for about one hour. The resulting liquid resin had a viscosity of about 2000 centipoise at 26° C. and total water recovered corresponded to 100% of water added in the formaldehyde solution.

EXAMPLE 4

To a solution of 1410 g (15 moles) of phenol and 7.0 g of zinc acetate dihydrate heated at 85° C., there was added formaldehyde as 200 g of paraformaldehyde (paraform) containing 91 weight percent formaldehyde, to a batch reactor vessel with vigorous stirring. A mild exotherm ensued and the reaction mixture was maintained at 80°-90° C. by cooling with a water bath as needed. After most of the paraform was dissolved which required about 15-20 minutes, additional paraformaldehyde was added over a 5-hour period in about 100 g increments to give a total of 990 g of 91% paraform (30 mole formaldehyde). When all the paraform had dissolved, about 75 g of toluene was added and a water separator attached. Toluene and water from impurities in the paraform as well as a small amount due to condensation reaction were removed by azeotropic distillation at atmospheric pressure as described in Example 1 until the reaction mixture reached 114° C. which required about 1½ hours. Residual water and toluene were then removed by flash distillation at 80°-90° C. under a reduced pressure of 50-100 mm Hg for about half an hour. The resulting liquid resin had a viscosity of 53,000 centipoise (Brookfield) at 23° C.

EXAMPLE 5

Phenol (1410 g., 15 mole), diethylene glycol (159 g) and zinc acetate dihydrate (7.0 g) were stirred at 80°-90° C. Paraformaldehyde (paraform) (990 g) was added in small portions as described in Example 4. The paraform contained 91% formaldehyde giving a total of 30 moles of added formaldehyde. When all the paraform was in solution (about 5 hours), toluene (75 g) was added. Water was removed by azeotropic distillation at atmospheric pressure until the reaction reached 110° C. which required about 5 hours. Residual toluene and residual water were then removed by flash distillation at 80°-90° C. at a reduced pressure of 50-100 mm. Hg for about 0.5 hours. The viscosity of the resulting liquid resin was about 10,900 centipoise (Brookfield) at 24° C. and 2,600 centipoise (Brookfield) at 27° C.

EXAMPLE 6

This example illustrates preparation of a p-cresol modified phenolic resin.

To a solution of phenol (1269 g, 13.5 moles), p-cresol (108 g., 1.5 moles) and 7.5 g of zinc acetate dihydrate at 80°-90° C. was added incrementally 990 g (30 moles) of 91% paraformaldehyde by the method described in Example 4. After adding toluene as described in Example 4 the water and toluene were removed by azeotropic distillation and flash distillation under reduced pressure as described in Examples 4 and 5. The viscosity of the resulting liquid prepolymer was about 13,400 centipoise (Brookfield) at about 20°-25° C.

EXAMPLE 7

This example illustrates preparation of a furfural modified resin.

A solution of 940 g of (10 moles) of phenol, 96.08 g (1 mole) of furfural and 4.7 g of zinc acetate dihydrate and 50 g of toluene was stirred and heated at 80°-90° C. Paraformaldehyde (495 g) divided into 10 equal portions, was added a portion of time over 4 hours. The paraform contained 91 weight percent formaldehyde to give a total of 15 moles of added formaldehyde. Water and toluene were removed using azeotropic distillation followed by a flash distillation as described in Examples 4 and 5. The resulting liquid resin product had a viscosity of 30,000 centipoise (Brookfield) at 20° C., 1150 centipoise (Brookfield) at 50° C., and 480 centipoise (Brookfield) at 60° C.

EXAMPLES 8-10

These examples illustrate the formation of reinforced composites of the invention. The liquid resin described in Example 1 was thoroughly mixed with a latent catalyst and injected by means of a injection device into a mold. The catalyst was a phenyl hydrogen maleate and was prepared by mixing an excess of phenol with maleic anhydride. The phenyl hydrogen maleate catalyst was present at a concentration of 3.9 weight percent based on the weight of the catalyst free resin. The mold containing the desired quantities of fiberglass mats, was preheated at 150°-155° C., and was clamped by a hydraulic press. The fiberglass mats were type AKM, available from PPG Industries, Inc., Pittsburgh, Pa. An exothermic curing reaction ensued raising the temperature to 175°-185° C. The composite plaques were demolded when the mold returned to its initial preheated temperature. The overall cycle was about 4-7 minutes. The mechanical properties and the fiberglass content in weight percent, based on the weight of the cured composite, of the compositions were as follows:

| EXAMPLES | 8 | 9 | 10 |
|---|---|---|---|
| Fiberglass content (wt %) | 47 | 50 | 62 |
| Flexural Modulus (psi × $10^{-6}$) | 1.69 | 1.93 | 2.2 |
| Flexural Strength (psi × $10^{-3}$) | 35.6 | 33.6 | 36.5 |
| Tensile Modulus (psi × $10^{-6}$) | 1.3 | 1.46 | 1.67 |
| Tensile Strength (psi × $10^{-3}$) | 21.6 | 22.9 | 25.6 |
| Percent Elongation | 2.2 | 1.95 | 2.0 |
| HDT (264 × psi × °C.) | >260 | >260 | >260 |
| Notched Izod (ft-lb/in) | 22 | 27 | 35 |

Examples 11-18 further illustrate the use of the composition of the reaction in molding by a hand technique.

EXAMPLE 11-12

The catalyst solution was prepared by dissolving 1 part of concentrated sulfuric acid in 9 parts of phenol. To the resin described in Example 4 was added the catalyst solution so that the liquid composition contained 0.2 weight percent sulfuric acid based on the weight of the catalyst free resin. The catalyzed resin was thoroughly mixed by hand and poured onto glass mats (type AKM) contained in an aluminum foil bag. The foil bag was then placed in a mold, pressurized to 300 psi with nitrogen, and heated in a hydraulic press at 150°-160° C. An exothermic reaction ensued and the content of the mold reached about 180° C. After the exotherm subsided, it was cooled to about 150° C. and the mold opened. Smooth glossy surfaced composite plaques were obtained.

The plaques were tested by the above mentioned procedures and the results of the tests, the glass content in weight percent based on the weight of the cured composite, and the total time the resin was cured at a temperature above 150° C. are summarized below.

| | EXAMPLE 11 | EXAMPLE 12 |
|---|---|---|
| Glass Content (wt %) | 38 | 40 |
| Flexural Modulus (psi × $10^{-6}$) | 1.05 | 1.4 |
| Flexural Strength (psi × $10^{-3}$) | 24.9 | 36.7 |
| Tensile Modulus (psi × $10^{-6}$) | 1.21 | 1.59 |
| Tensile Strength (psi × $10^{-3}$) | 13.8 | 21.1 |
| HDT (264 × psi × °C.) | >260 | >260 |
| Notched Izod (ft-lb/in) | 14 | 20 |
| Total time at temp. >150° C. (min) | 10 | 7 |

EXAMPLE 13-15

Diethylene glycol modified resin described in Example 5 was admixed with different catalysts and poured onto glass mats as described in Examples 11-12. The weight percent glass content, based on the cured composite, and the particular catalyst used in its concentration in weight percent, based on the weight of the catalyst free composition, are shown in the table below. The cure temperature profile is shown as three temperatures; the temperature to which the mold was set at the beginning of the curing process, the highest temperature encountered during the exotherm after the resin was injected, and the temperature to which the mold was cooled and at which it was opened after the exotherm had subsided. The time at cure temperature refers to the time the temperature in the mold was within the temperature profile.

| | EXAMPLE 13 | EXAMPLE 14 | EXAMPLE 15 |
|---|---|---|---|
| Catalyst (wt. %) | | | |
| Chlorsulfonic Acid | 0.2 | 0.2 | — |
| Boron trifluoride etherate | 0.15 | — | 0.2 |
| Sulfuric Acid | — | — | 0.2 |
| Cure Temp. Profile (°C.) | 160-175-160 | 160-174-164 | 158-165-163 |
| Time at Cure Temp. (min) | 5 | 3 | 6 |
| Glass content (wt %) | 35.5 | 37 | 49 |

EXAMPLE 16-17

The furfural modified resin described in Example 7 was admixed with a sulfuric acid catalyst solution to a concentration level of 0.2 parts by weight of concentrated sulfuric acid per 100 parts of resin. The molding condition at which these examples were conducted are as those described in Examples 11-12. The cure temperature profile, cure time and weight percent glass content of the compositions are given below.

| | EXAMPLE 16 | EXAMPLE 17 |
|---|---|---|
| Cure Temp. (°C.) | 151-173-167 | 150-167-165 |
| Time at Cure Temp. (min) | 5 | 6 |
| Glass content (wt %) | 35.5 | 46.5 |

EXAMPLE 18

The p-Cresol modified prepolymer described in Example 6 was admixed with the catalyst solution to a concentration level of 0.2 weight percent of concentrated sulfuric acid, based on the catalyst free resin. A fiberglass reinforced composite was molded by the method described in Examples 11 and 12. The cure temperature profile was 157-186-171; and was held at within these temperatures for about 6 minutes. The glass content was 41 weight percent.

EXAMPLE 19

Composite plaques were made as described above and tested for impact loading properties. Tests were also run on composites made from a commercially available vinyl ester and a commercially available isophthalic polyester for comparison.

The testing apparatus was a rheometric high speed impact tester comprising a 0.5 inch diameter weighted ram with a hemispherical nose. The ram impacts at a known velocity a sample composite plaque clamped over a steel plate with a 3 inch diameter circular cutout. The apparatus is equipped with a load cell so that the impact force may be measured. Various samples of a composite composition of constant thickness and glass content were tested and the impact force and the deflection, the distance the ram penetrated the plate, were measured. The ram speed was 5 mile/hour. From this data the maximum impact force ($F_{max}$) that a particular composition of a certain thickness and glass content could absorb was determined. It was found that $F_{max}$ varied approximately with the inverse square of the composite sample, composition and glass content being equal. Therefore, a Coefficient Of Rupture (COR) was used for comparison purposes, where $$COR = F_{max}/t^2,$$

$F_{max}$ is defined above and t is the thickness of the sample.

Composite plaques tested were made essentially in the manner described in Examples 1 and 8 to 10 using the hemiformal containing resoles described above in a liquid injection process. Plaques were also made using a sheet molding compounds method with a vinyl ester themosetting composition commercially available from Dow Chemical Company, Midland, Mich. under the name of "Derakane". Plaques were also made using a sheet molding compounds method with a isophthalic polyester thermosetting composition commercially available from United States Steel Corporation, Pittsburgh, Pa., under the designation "MA 14017". The glass content of the plaques was set as near a standard 65 weight percent as possible and the thickness near 100 mils. The plaques were reinforced with the Type AKM glass fiber described above. The above plaques were tested at room temperature (20°–30° C.) and in an environmental chamber at −35° C. on the above-described test apparatus. The COR was calculated for plaques made from hemiformal resoles (Resole) of the invention, the commercial vinyl ester and the commercial isophthalic polyester (polyester) compositions as described above. In Table I are summarized the results. Shown are the COR for each temperature and the glass content in weight percent of the indicated composite plaques.

TABLE I

| Thermosetting Composition | Wt. % Glass | COR (lb./in.² 10³) 20-30° C. | −35° C. |
|---|---|---|---|
| Polyester | 68 | 151.5 | 185.6 |

TABLE I-continued

| Thermosetting Composition | Wt. % Glass | COR (lb./in.² 10³) 20-30° C. | −35° C. |
|---|---|---|---|
| Vinyl Ester | 67 | 120.2 | 133.3 |
| Resole | 66.5 | 141.5 | 157.6 |

As shown by the above data the of the invention have impact properties comparable to commercially available materials. This is surprising since composites of phenolic-type resins having such a high glass content would be generally expected in the art to have significantly inferior properties.

EXAMPLE 20

Four composites of differing composition were tested for comparison purposes. Composites made from a polyester, and a vinyl ester thermosetting composition and a composite according to the present invention were made as described in Example 19 except the glass content was 60 weight percent. Also, by a sheet molding compounds process, a composite was made from a conventional bulk molding phenolic composition available from General Electric Company under the designation "Genal GF 7031P." The glass type and content of this composition is unknown. It represents a typical bulk molding phenolic type composition currently available commercially. The four described composites were tested, and the results summarized on Table II. The tests were carried out as described above. The flammability test used was UL-94. A V-O designation represents the best non-flammability rating for that test. The results show physical properties of the composites of the invention markedly superior to that from the conventional phenolic bulk compound. Its physical properties are comparable to the polyester and vinyl ester but it shows a much better flammability resistance.

TABLE II

| Thermosetting Composition | Flex. Modulus (PSI × 10⁶) | Flex. Strength (PSI × 10³) | Tensile Strength (PSI × 10³) | % Elong. | Notched Izod (Ft.lb/In) | Flammability (UL-94) |
|---|---|---|---|---|---|---|
| Vinyl Ester | 1.75 | 45 | 30.0 | 2.0 | 23 | BURNS |
| Polyester | 1.75 | 40 | 28.0 | 1.75 | 18 | BURNS |
| Resole of Invention | 1.75 | 33 | 23.0 | 2.0 | 35 | V-O |
| Conventional Phenolic | 1.8 | 15.0 | 9.0 | — | 0.45 | V-O |

EXAMPLE 21

Composite sample plaques were made as described in Examples 1 and 8 to 10 and tested for tension-tension fatigue. A tension-tension fatigue test comprises subjecting the sample to a variable tensile load. In the test used the plaques were placed in standard tensile bars as are used in ASTM D-638 with a four inch gage length and a width of one-half inch. Using servo-hydraulic equipment the plaques were subjected to varying periodic tensile load of sinusoidal nature that varied between a known maximum load ($T_{max}$) and a minimum load of 5.25% of the maximum load. The frequency of the load was 5 Hz. Tests were run until 1,000,000 periods were applied or the sample being tested failed. If the sample survived 1,000,000 periods it was subjected to tests to determine its residual properties. The residual properties tested were the tensile modulus, tensile strength and percent elongation using the above described procedures. The plaques were made as essentially described in Examples 1 and 8 to 10 except the glass content is as shown in Table III. In Table III is also shown a summary of the tests of three samples. Shown are the number of cycles to failure, the maximum tensile load ($T_{max}$) and the residual properties.

TABLE III

| | | | Residual Properties | | |
|---|---|---|---|---|---|
| Wt. % Glass | $T_{max}$ (psi × $10^3$) | Cycles to Failure | Tensile modulus (psi × $10^6$) | Tensile Strength (psi × $10^3$) | Elongation |
| 58 | 10 | >$10^6$ | 1.81 | 21.9 | 1.25 |
| 59 | 8 | >$10^6$ | 1.92 | 30.1 | 1.85 |
| 59 | 7 | >$10^6$ | 1.77 | 29.3 | 1.95 |

As shown in Table III the sample plaques survived 1,000,000 cycles and showed reasonable residual properties. The results of the above tests showed that composites having excellent tension-tension fatigue properties can be made from phenol-formaldehyde resoles. The tension-tension fatigue properties of the composites tested are comparable to those of polyester and vinyl ester composites as those made as in Example 20. This is surprising in light of the general recognition in the art the composites of phenolic-type resins generally have inferior impact properties. This is demonstrated by the low notched Izod (generally less than one) that is typical of commercially available composites of the prior art, more than an order of magnitude less that obtained by the composites of the invention, up to 35 ft.lb/in. It would be expected that a composite having as low a notched izod as the commercial phenolic composites of the prior art would fail well before one million cycles in a tension-tension fatigue test.

The composites of the invention represent a major advance in the art. Composites can be made that are comparable to the sturdy polyester an vinyl ester-type composites in commercial use. The composites of the invention, however, have the additional advantage of being flame resistant whereas polyester and vinyl esters readily burn.

We claim:

1. A reinforced cured composite made by a liquid injection molding process, said composite comprising from about 20 to about 70 weight percent, based on the weight of the cured composite, of a reinforcing material, and about 30 to about 80 weight percent, based on the weight of the cured composite, of a crosslinked phenol-formaldehyde solid resin derived from a curable liquid phenol-formaldehyde resole resin having a viscosity of less than about 10,000 centipoise at 25° C., and containing less than about 5 weight percent, based on the weight of the liquid resin, of unbound water and volatile organic compounds and having the general formula

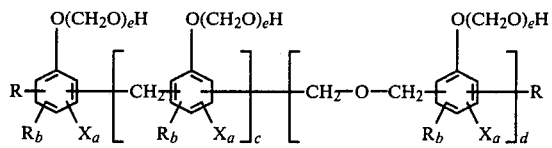

wherein a is from 0 to 3, b is 0 to 1, the sum of a and b does not exceed 3, the sum of c and d is from 2 to about 20, the mole fraction d/(c+d) is 0.4 to 0.9, preferably 0.6 to 0.8, e is 0 to about 5, R is —CH$_2$O(CH$_2$O)$_e$H, X is a monovalent radical, wherein for at least one of the R or O(CH$_2$O)$_e$H groups e is at least 1, wherein at least 50 mole percent of the

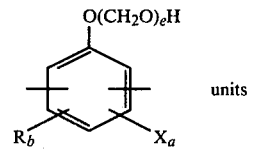 units are 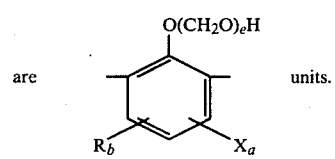 units.

2. A composite as defined in claim 1, comprising about 50 to about 70 weight percent of the reinforcing material and from about 30 to about 50 weight percent of the crosslinked phenol-formaldehyde solid resin.

3. A composite as defined in claim 1, wherein the curable liquid resin contains less than 2 weight percent of unbound water and volatile organic compounds.

4. A composite as defined in claim 1, wherein the reinforcing material is selected from the group consisting of glass fiber, aromatic polyamide fiber, or graphite fiber.

* * * * *